United States Patent Office.

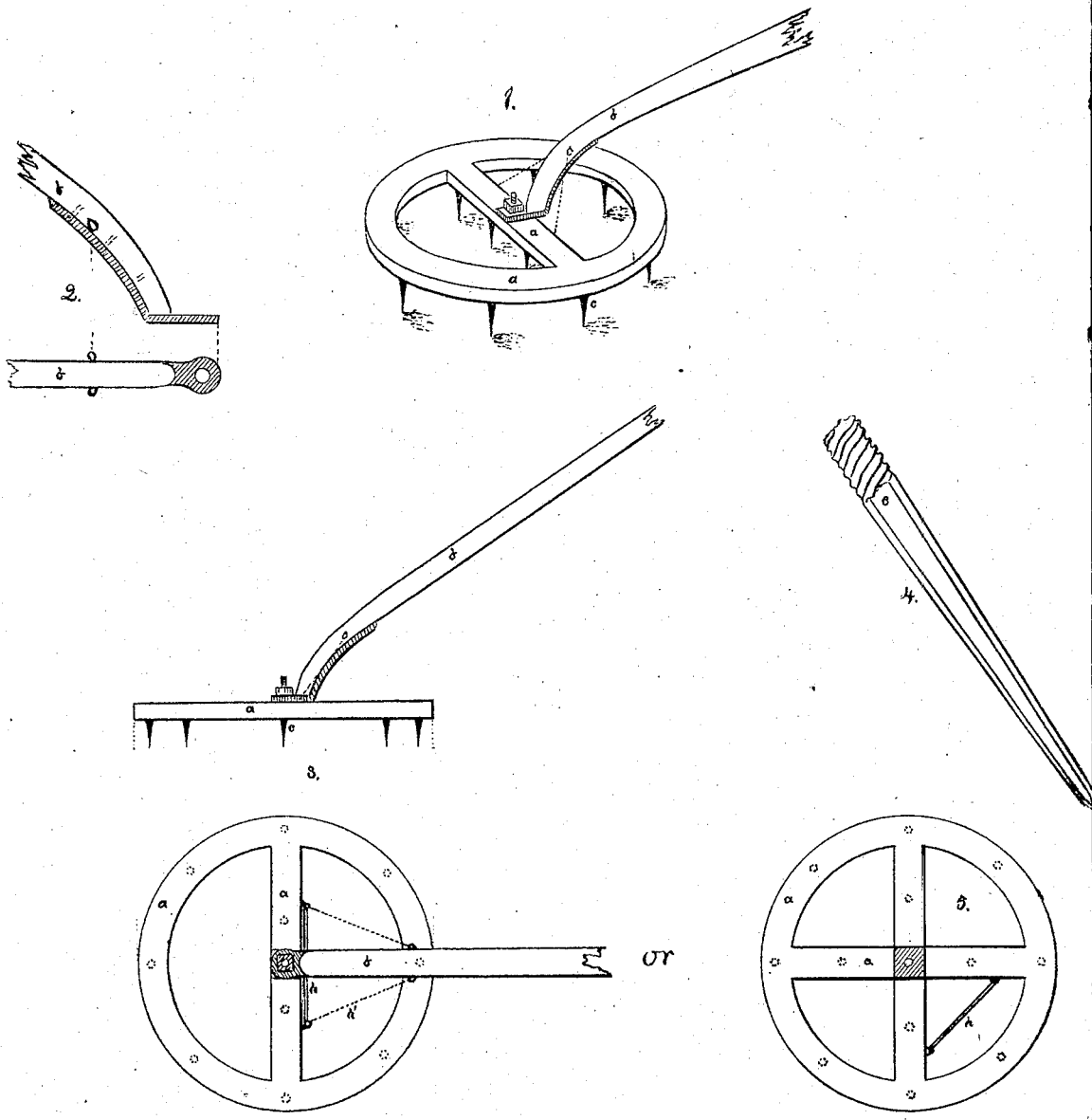

JOHN HENRY BUTLER, OF SCOTTSVILLE, KENTUCKY.

*Letters Patent No. 74,987, dated March 3, 1868.*

IMPROVEMENT IN RAKES.

The Schedule referred to in these Letters Patent and making part of the same.

TO ALL WHOM IT MAY CONCERN:

Be it known that I, JOHN HENRY BUTLER, of the town of Scottsville, in the county of Allen, and State of Kentucky, have invented a new and useful machine for raking and pulverizing ground, and preparing it for cultivation, and for cultivating it after seed has been planted. My invention may be denominated "A Circular and Rotary Rake;" and I do hereby declare that the following is a full, clear, and exact description of the construction and operation of the same, reference being had to the accompanying drawings, and the letters of reference marked thereon.

My invention, or "circular and rotary rake," consists of a circle, made of wood, iron, or other strong and suitable material, of any dimensions the constructor pleases, marked $a$ in the drawings. The periphery of the circle must be sufficiently broad, and thick, and strong to hold iron or wooden teeth in position, so that they will not give way, as represented in the accompanying drawings, (see No. 1.) Across the centre of the circle there must be one or two pieces of the same material as the circular frame, sufficiently strong to hold teeth, as above described. These cross-pieces must be attached to the circular frame at their ends, with such strength as not to give way by the working of the machine, as represented in the drawings. Upon the top and in the centre of these cross-pieces, and in the centre of the circle, there must be a thin plate of iron, steel, or other hard and suitable metal, capable, as far as can be, of resisting the effects of friction, extending from side to side of the cross-pieces.

The teeth for pulverizing the ground are to be inserted into the circular frame, and into the cross-pieces, as represented in the drawings, and may be made as numerous, according to the size of the rake, as is desired.

Through the centre of the circle, and at the intersection of the cross-beams or pieces, is to be inserted a piece of iron, steel, or other suitable substance, and is to be made very tight and strong. Where it passes above the plate, it must be made perfectly round, so that it may revolve in the handle by which the machine or rake is worked. This piece of iron or steel, or other suitable substance, is to rise perpendicular to the plane of the circular frame, and is to pass through a hole made in the lower end of the handle to receive it, and, by means of a screw and screw-tap, to connect the handle and other part of the rake or machine, (as represented in Nos. 1 and 3 in the drawings;) but, at the same time, is to allow a free rotary motion of the circular frame in the handle. There must be a plate attached to the lower part of the handle, as represented in No. 2 of the drawings, by which it is attached to the circular frame. It must be of sufficient thickness to give a steady motion to the revolution of the lower part of the rake. There must be a washer between the screw-tap and the plate connecting the handle and circular frame. The handle may be of any length desired, and be made to ascend from the circular frame at an angle of forty-five degrees, more or less, as desired. The great object in making the connection between the handle and circular frame is, strength and diminution of friction, so as still to allow a free revolution of the circular frame either way. With a view to prevent the revolution of the circle, and make the rake operate on the ground as a common rake, I have inserted an iron staple on each side of the handle, into which hooks, attached to one of the cross-pieces, one on each side of the centre, may be fastened, so as to hold the handle firm in one position, (see No. 3 of the drawings.) The iron hooks, when not in use for the purpose designed, are prevented from dangling in the way, and impeding the use of the machine, as represented in No. 3 of the drawings.

What I claim as my invention, and desire to secure by Letters Patent, is—

The circular and rotary construction of the machine above described, connected with a handle, as above described, and having teeth inserted in the usual manner in the circular frame, and by means of iron hooks and staples, above described, preventing the rotary motion of the machine, at pleasure, and thereby converting it into a common rake.

J. H. BUTLER.

Witnesses:
ROBERT UNDERWOOD,
JNO. C. UNDERWOOD.